(12) United States Patent
Pepe et al.

(10) Patent No.: US 7,687,716 B2
(45) Date of Patent: Mar. 30, 2010

(54) ADJUSTABLE CABLE SUPPORT BRACKET FOR AN ELECTRICAL COMPONENT

(75) Inventors: Paul John Pepe, Clemmons, NC (US); Jeffrey Lane McNeal, Winston-Salem, NC (US); Stephen Scott Herndon, Danville, VA (US)

(73) Assignee: Tyco Electronics Corporation, Middletown, PA (US)

( * ) Notice: Subject to any disclaimer, the term of this patent is extended or adjusted under 35 U.S.C. 154(b) by 354 days.

(21) Appl. No.: 11/811,179

(22) Filed: Jun. 7, 2007

(65) Prior Publication Data

US 2008/0302922 A1 Dec. 11, 2008

(51) Int. Cl.
 *H02G 3/04* (2006.01)
(52) U.S. Cl. .................. 174/101; 174/50; 174/68.1; 174/72 A; 174/135; 211/26; 248/65; 361/826; 379/439
(58) Field of Classification Search .................. 174/50, 174/101, 68.1, 68.3, 72 A, 135; 211/26; 248/65, 68.1; 379/438; 361/826, 827, 829; 439/719
See application file for complete search history.

(56) References Cited

U.S. PATENT DOCUMENTS

| | | | |
|---|---|---|---|
| 6,170,784 B1 * | 1/2001 | MacDonald et al. | 248/65 |
| 6,321,917 B1 | 11/2001 | Mendoza | |
| 6,568,542 B1 | 5/2003 | Chen | |
| 7,352,947 B2 * | 4/2008 | Phung et al. | 385/135 |
| 2002/0129959 A1 | 9/2002 | Petersen | |

FOREIGN PATENT DOCUMENTS

WO WO 01/45222 A1 6/2001

* cited by examiner

*Primary Examiner*—Dhiru R Patel

(57) ABSTRACT

A cable management system for an electrical component having a connectivity interface configured to connect with cables includes a cable support bracket having a cable support plate configured to support the cables connected to the connectivity interface, and an arm having first and second arm portions. The first arm portion being coupled to the cable support plate and the second arm portion configured to be coupled to the electrical component. The first and second arm portions are selectively positionable with respect to one another such that the position of the cable support plate may be changed with respect to the connectivity interface.

21 Claims, 9 Drawing Sheets

ADJUSTABLE CABLE SUPPORT BRACKET FOR AN ELECTRICAL COMPONENT

BACKGROUND OF THE INVENTION

This invention relates generally to cable management, and more particularly, to cable support brackets for electrical components.

Numerous cable management systems exist today and are used in various electronics equipment applications, such as telecommunications, data transmission, networking, video and the like. Typically, to install a cable management system, a rack frame is securely mounted to the floor within the room in which the system is to be maintained. Multiple patch panels or boxes are then secured to the frame in a stacked arrangement. Each patch panel includes multiple connector ports (e.g. RJ45 connector ports) along the front face thereof and multiple associated cable connections on the rear face thereof.

Conventional patch panels are generally constructed with a rectangular or square horizontal cross sectional geometry or footprint. Each patch panel includes a planar front face. When the patch panels are mounted within the frame, the front faces align with one another in a vertical plane. The patch panels have a height in the vertical direction and a width in the lateral direction. The number of patch panels that are vertically stacked upon one another and the width of the individual patch panels determine the outer dimensions of a connectivity interface within which individual connector ports are retained and arranged in a desired pattern.

As information technology evolves and improves, the need increases for each patch panel system to support more and more individual users. As the number of users increases so does the need for more connector ports and cables which increases the overall physical size. To add capacity at the connectivity interface, the front face is expanded vertically by stacking additional patch panels upon one another. Alternatively or in addition, the connectivity interface is expanded laterally by increasing the width of each patch panel.

With the increase in the number of cables within patch panel systems, cable management systems typically include cable support bars that are coupled to the frame and are spaced apart from the patch panels. The cable support bars direct the cables away from the rear of the patch panels and generally organize the cables. With the increase in the number of patch panels and the number of cables, a typical cable management system includes differently sized cable support bars that arrange the cables at different depths with respect to the patch panels. For example, two inch, four inch and six inch cable support bars may be provided in a typical cable management system. The different sized cable support bars position the cables at different depths from the patch panel to organize and manage the cables. However, to assemble these conventional cable management systems, the installer must carry the differently sized cable support bars in inventory. Having differently sized cable support bars adds to the cost and the complexity of the installation of conventional cable management systems.

A need remains for an improved cable management system having cable supports that may be installed in a time-efficient and reliable manner.

BRIEF DESCRIPTION OF THE INVENTION

In an exemplary embodiment, a cable management system is provided for an electrical component having a connectivity interface configured to connect with cables. The cable management system includes a cable support bracket having a cable support plate configured to support the cables connected to the connectivity interface, and an arm having first and second arm portions. The first arm portion being coupled to the cable support plate and the second arm portion configured to be coupled to the electrical component. The first and second arm portions are selectively positionable with respect to one another such that the position of the cable support plate may be changed with respect to the connectivity interface.

Optionally, the first and second arm portions may be slidably coupled to one another. The first arm portion may include at least two openings spaced apart from one another along a longitudinal axis of the first arm portion. The cable support bracket may further include a fastener configured to be received in one of the openings to secure the first and second arm portions to one another. Alternatively, the first arm portion may include an elongated slot extending along a longitudinal axis of the first arm portion, wherein the fastener is configured to be received in the slot, and selectively positionable along the slot, to secure the first and second arm portions to one another. Optionally, the first arm portion may define an inner rail and the second arm portion may define an outer rail, wherein the inner and outer rails are slidably coupled to one another and configured to be secured in position with respect to one another.

Optionally, the cable management system may further include a second cable support bracket having a second arm configured to be coupled to the electrical component and supporting the cable support plate. The second arm may include third and fourth arm portions, wherein the third arm portion is coupled to the cable support plate and the fourth arm portion is configured to be coupled to electrical component. The third and fourth arm portions may be selectively positionable with respect to one another such that the position of the cable support plate may be changed with respect to the electrical component.

In another exemplary embodiment, a cable support bracket is provided that includes a first rail having a wall extending between opposed ends and a support plate interface proximate one of the ends. A cable support plate is positioned at the support plate interface. The cable support bracket also includes a second rail having a wall extending between opposed ends and a mounting portion proximate one of the ends that is configured to be mounted to electrical component, and to be secured thereto. The first rail and the second rail are coupled to one another and are selectively positionable with respect to one another such that the position of the cable support plate may be changed with respect to the electrical component.

DETAILED DESCRIPTION OF THE INVENTION

Figure 1:
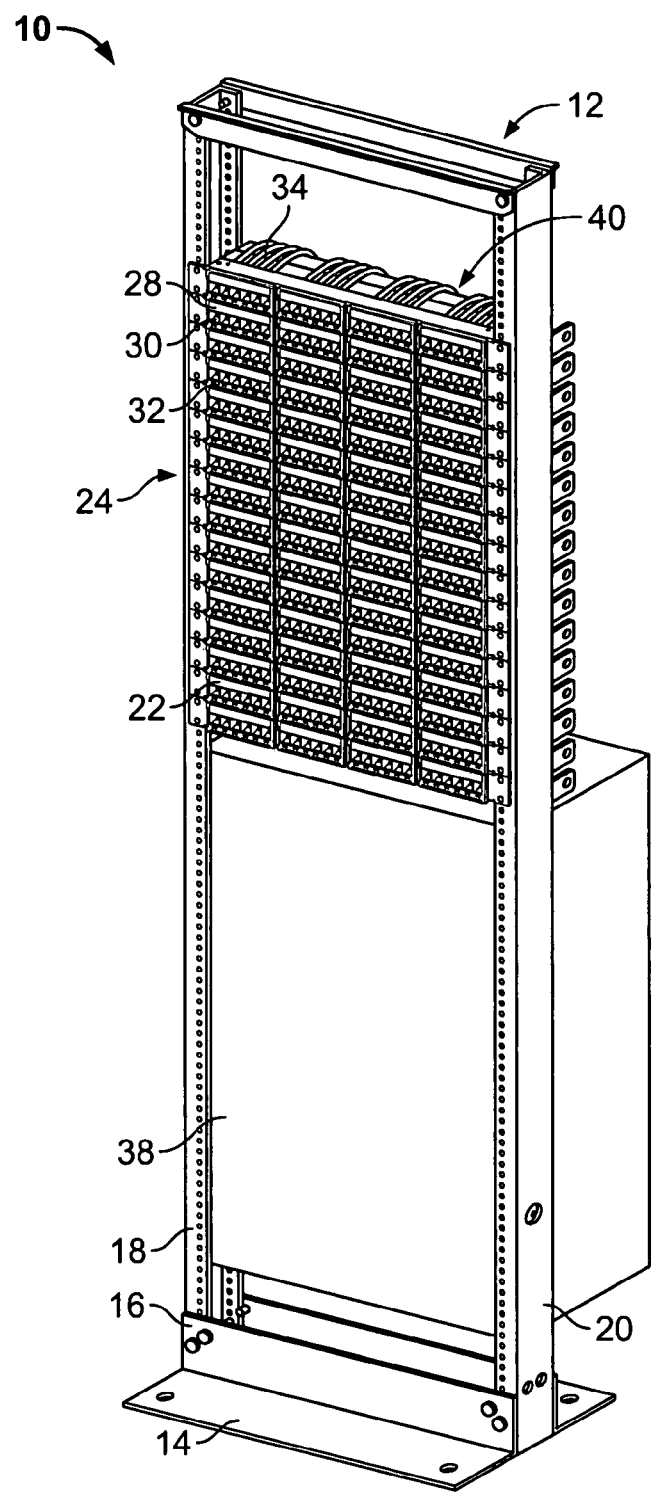
FIG. 1 illustrates a cable management system for a distribution assembly and formed in accordance with an exemplary embodiment.

FIG. 1 illustrates a cable management system 10 for a distribution assembly 24 and formed in accordance with an exemplary embodiment. The cable management system 10 is provided for managing cables for the distribution assembly 24. It is noted that the distribution assembly 24 illustrated in FIG. 1 is merely illustrative of an exemplary system/component utilizing the cable management system 10, and other types of systems/components may also utilize the cable management system 10, such as a patch panel, a switch, an equipment rack, or another type of system/component having cables attached thereto or extending therefrom. In the illustrated embodiment, the distribution assembly 24 includes a rack frame 12 that is configured to be mounted to the floor and/or ceiling of an applications room. The rack frame 12 includes a base plate 14 having an upper flange 16 that is joined to legs 18 and 20.

A plurality of patch panels 22 are arranged in a stacked configuration forming the distribution assembly 24. In the illustrated embodiment, the patch panels 22 are generally planar, however, other types of patch panels may be used, such as curved or angled patch panels, or patch panels having a generally V-shape. The patch panels 22 are securely attached to the rack frame 12 in a manner that is explained below in more detail.

The patch panels 22 include a plurality of openings 26 (shown in FIG. 2) for receiving electronic modules 28 therein. In an exemplary embodiment, the electronic modules 28 include multiple connector ports 30 (e.g. RJ45 connector ports) along a front connectivity interface 32 of the patch panel 22. Each connector port 30 is adapted to receive a plug on a mating cable (not shown) that conveys a single data stream. Corresponding cables 34 are also connected to the electronic modules 28 at a rear connectivity interface 36 (shown in FIG. 2) of the patch panel 22. The cables 34 are routed generally behind the patch panels 22. In the illustrated embodiment, the cables 34 are routed to an equipment system 38 (such as a switching network), although the system 38 may be entirely removed or may be located in a different location.

A plurality of cable managers 40 are also stacked upon one another and arranged generally behind the patch panels 22. The cable managers 40 are used to support and/or manage the cables 34 extending from the rear connectivity interface 36 of the patch panel 22. The rack frame 12 extends upward along each of the cable managers 40. In an exemplary embodiment, the cable managers 40 are securely attached to respective ones of the patch panels 22. The cable managers 40 may be secured to the patch panels 22 to be free standing independent of the rack frame 12, and as such may be secured to the patch panels 22 either before or after the patch panels 22 are securely attached to the rack frame 12. In an alternative embodiment, the cable managers 40 may be securely attached to the rack frame 12 in addition to, or alternatively to, being attached to the patch panels 14. For example, a support or bracket may extend from the rack frame 12, to which the cable managers 40 are mounted.

Figure 2:
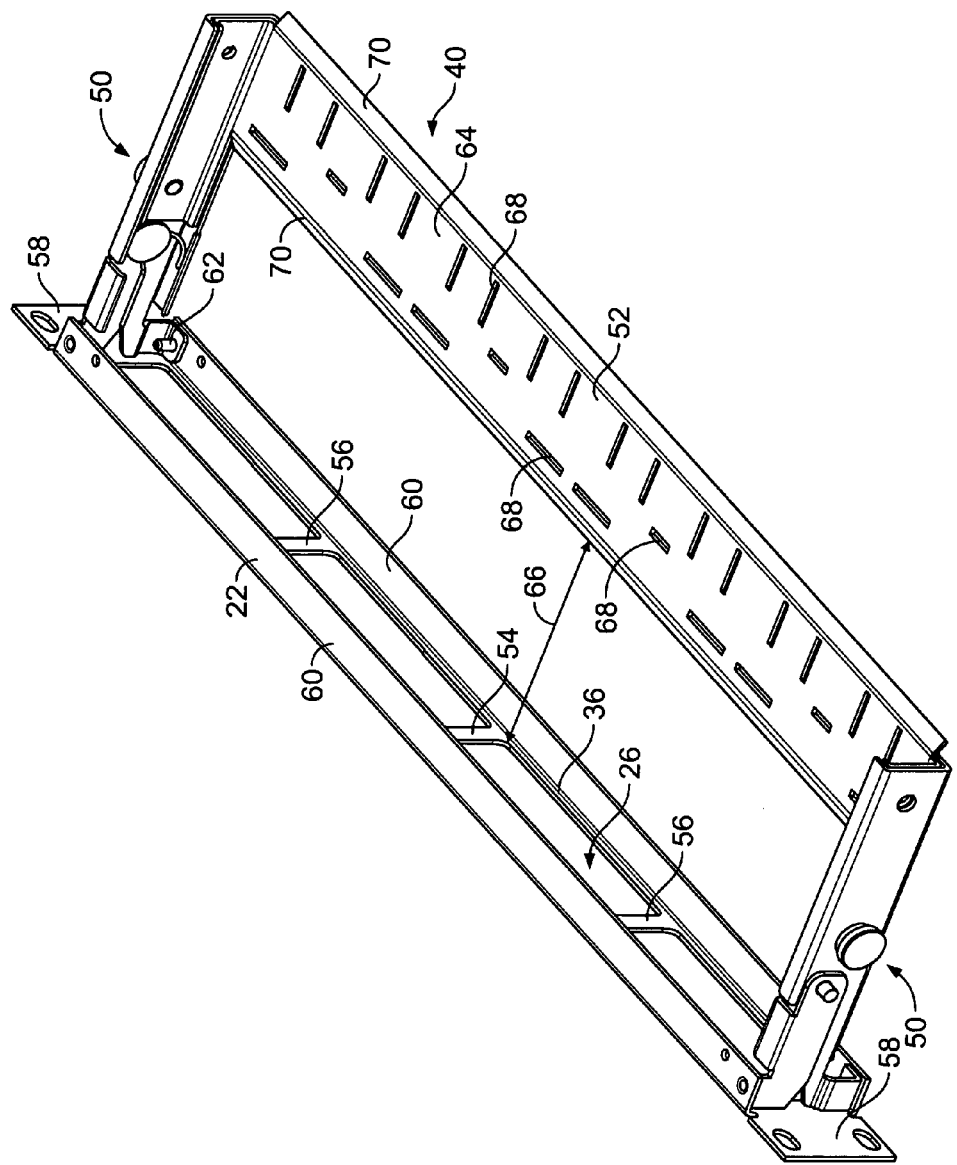
FIG. 2 is a rear perspective view of a cable manager, including cable support brackets, for the cable management system shown in FIG. 1.

FIG. 2 is a rear perspective view of one of the cable managers 40 securely attached to a corresponding one of the patch panels 22 for the cable management system 10 (shown in FIG. 1). The cable manager 40 includes a pair of cable support brackets 50 that are attached to the patch panel 22 and a cable support plate 52 that extends between the opposed cable support brackets 50. In an exemplary embodiment, and as described in further detail below, the cable support brackets 50 may be secured to the patch panel 22 by hand and without the need for a separate tool. As such, the cable support brackets 50 may be secured to the patch panel 22 quickly and efficiently. Alternatively, the cable support brackets 50 may be secured to the patch panel 22 by fasteners that require a tool to tighten. The cable support brackets 50 hold and position the cable support plate 52, such that the cable support plate 52 may support the cables 34 (shown in FIG. 1). Optionally, the cable support plate 52 may be integrally formed with the cable support brackets 50. Alternatively, the cable support plate 52 may be secured to the cable support brackets 50, such as by using fasteners or by welding the pieces together.

The patch panel 22 includes an upright wall 54 that includes the plurality of openings 26 for receiving the electronic modules 28 (shown in FIG. 1). The upright wall 54 is generally planar, however, may be non-planar in alternative embodiments, such as by including angled wall sections which provide a generally outwardly convex or bowed surface when viewed from the front connectivity interface 32. The openings 26 are separated by connecting portions 56. Tabs 58 extend from the opposed ends of the upright wall 54 and are used to mount the patch panel 22 to the rack frame 12 (shown in FIG. 1). In one embodiment, the tabs 58 are secured to the rack frame 12 using fasteners (not shown). When the patch panel 22 is secured to the rack frame 12, the upright wall 54 has a generally vertical orientation.

The patch panel 22 also includes ledges 60 that extend from opposed top and bottom sides of the upright wall 54. The ledges 60 extend rearward from the rear connectivity interface 36. In an exemplary embodiment, each ledge 60 includes mounting posts 62 extending inwardly therefrom. The mounting posts 62 are used for mounting the cable manager 40 to the patch panel 22, as described in more detail below. In the illustrated embodiment, the lower ledge 60 includes upwardly extending mounting posts 62 at two mounting locations for attaching respective ones of the opposed cable support brackets 50. Similarly, the upper ledge 60 includes downwardly extending mounting posts 62 at two mounting locations for attaching to respective ones of the opposed cable support brackets 50. While two mounting locations are illustrated, it is realized that more or less mounting locations may be provided depending on the number of cable support brackets 50 used to support the support plate 52. For example, a single cable support bracket 50 may be used to support the support plate 52, such as in a substantially central location of the patch panel 22.

Alternative mounting elements may be provided on the patch panel 22 for mounting the cable managers 40 to the patch panel 22. For example, the patch panel 22 may include latches (not shown) for engaging and securing the cable manager thereto. Alternatively, the patch panel 22 may include openings, slots, holes or channels for receiving portions of the cable manager 40 and/or fasteners (not shown) used to secure the cable manager 40 to the patch panel 22.

The cable support plate 52 includes a support surface 64 for supporting the cables 34. The support plate 52 is generally spaced apart from the rear connectivity interface 36 by a distance 66 that is controlled by the cable support brackets 50, as will be explained in further detail below. The support plate 52 extends generally parallel to the patch panel 22 and is aligned with at least one of the openings 26 in the patch panel 22. In the illustrated embodiment, the support plate 52 is aligned with all of the openings 26 and is used to support cables 34 from electronic modules 28 received in each of the openings 26. However, in alternative embodiments, multiple cable managers 40 may be used for each patch panel 22 such that each support plate 52 supports cables 34 from less than all of the electronic modules 28 associated with the patch panel 22. Optionally, the support surface 64 may be generally planar and may be oriented perpendicular with respect to the upright wall 54 of the patch panel 22. For example, when the cable manager 40 is mounted to the patch panel 22, the support surface 64 has a generally horizontal orientation.

In an exemplary embodiment, the support plate 52 includes a plurality of elongated channels 68. The elongated channels 68 are configured to receive clips (not shown) that are used to organize the cables 34. Alternatively, the elongated channels 68 may receive wire ties (not shown) that are used to secure the cables 34 in selected positions along the support surface 64. In an exemplary embodiment, the support plate 52 includes beveled edges 70 at the front and rear sides of the support plate 52. The beveled edges 70 are angled with respect to the support surface 64. The beveled edges 70 provide rigidity to the support plate 52. The beveled edge 70 at the rear side of the support plate 52 is angled to resist damage (e.g. cutting or slicing) to the cables 34 as the cables 34 are draped over the rear side.

Figure 3:
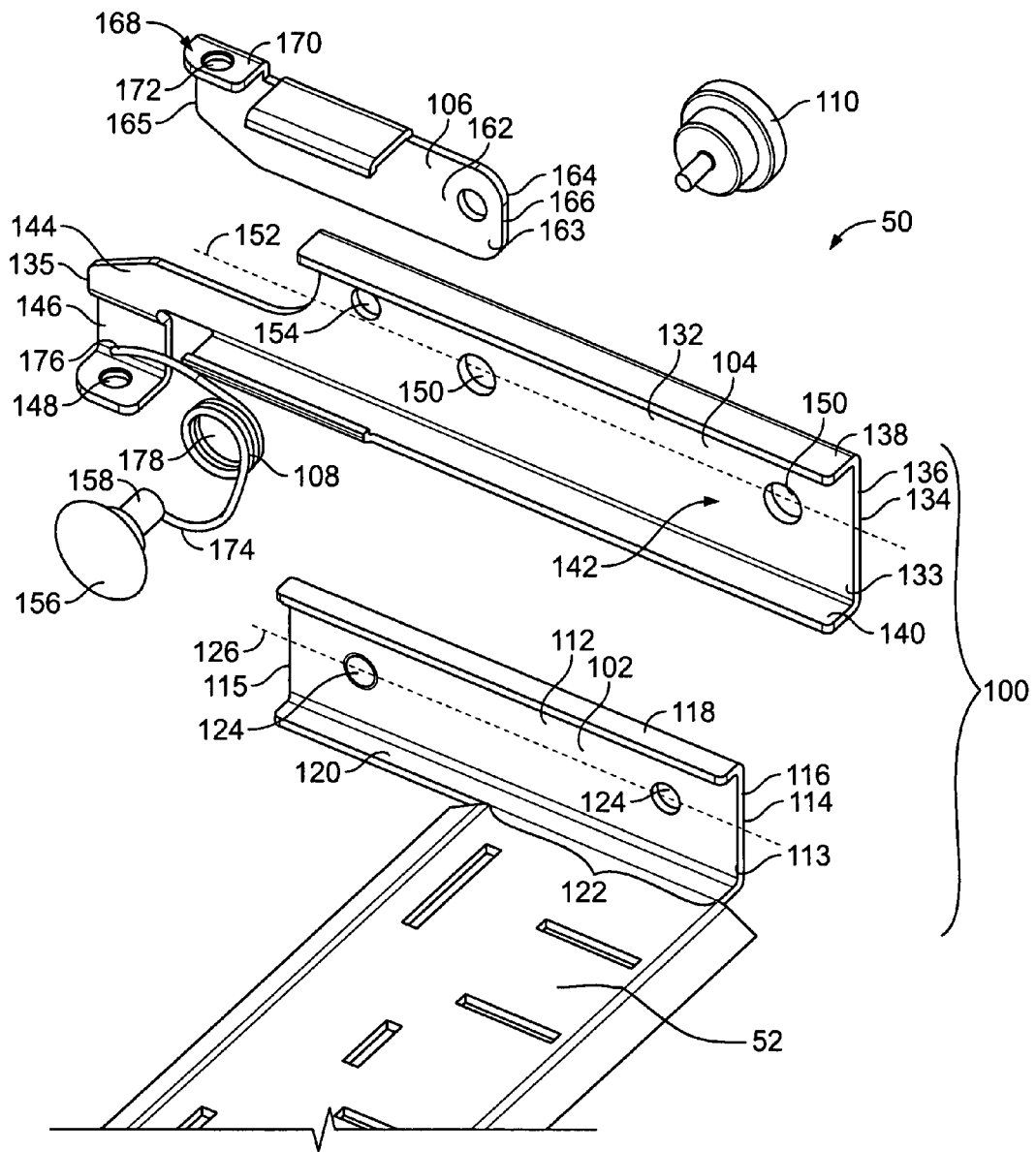
FIG. 3 is an exploded view of one of the cable support brackets shown in FIG. 2.

FIG. 3 is an exploded view of one of the cable support brackets 50. The cable support bracket 50 includes an arm 100 having first and second arm portions 102, 104, a locking finger 106 movably coupled to the second arm portion 104, and a bias mechanism 108. The bias mechanism 108 operatively engages the second arm portion 104 and the locking finger 106 to facilitate relative movement between the second arm portion 104 and the locking finger 106. The cable support bracket 50 is configured to be coupled to the patch panel 22 (shown in FIGS. 1 and 2) and/or the rack frame 12 (shown in FIG. 1) by the second arm portion 104 and the locking finger 106, as described in further detail below. The bracket support plate 52 extends from the first arm portion 102.

In an exemplary embodiment, and as described in further detail below, the first and second arm portions 102, 104 are movably coupled to one another such that the first arm member 102 may be selectively positioned with respect to the second arm member 104. The first and second arm portions 102, 104 are coupled to one another using a coupler 110, such as a threaded fastener, a thumb screw, a captive fastener, a pin, a bolt, a dowel, a rivet, a latch, a wire tie, and the like. While it is beneficial that the coupler 110 be removable to provide the ability for repositioning of the first and second arm portions 102, 104, the first and second arm portions 102, 104 may be permanently coupled to one another, such as by welding the portions to one another, rather than using a removable coupler 110, in alternative embodiments. In another alternative embodiment, the arm 100 may be a single member that is not adjustable, but rather positions the cable support plate 52 at a predetermined distance from the patch panel 22.

Optionally, and as illustrated in the embodiments shown in FIGS. 2 and 3, the first and second arm portions 102, 104 represent first and second rails that are slidably coupled to one another. The first and second arm portions 102, 104 may also be referred to hereinafter as first and second rails 102, 104, or alternatively, may also be referred to hereinafter as an inner rail 102 and an outer rail 104. While the first and second arm portions may be illustrated and referred to as rails, it is realized that the arm portions 102, 104 may have different shapes and/or sizes than the rails illustrated in the various embodiments, such as flat, plate-like structures that are coupled to one another.

The first arm portion 102 includes an upright wall 112 having an inner surface 113 and an outer surface 114. The first arm portion 102 extends between a front end 115 and a rear end 116. An upper rail 118 extends generally inwardly from a top side of the upright wall 112. A lower rail 120 extends generally inwardly from a bottom side of the upright wall 112. The first arm portion 102 includes a support plate interface 122 along the lower rail 120. The support plate 52 is attached to the first arm portion 102 at the support plate interface 122. In an exemplary embodiment, the support plate 52 is integrally formed with the first arm portion 102 and extends from the first arm portion 102 at the support plate interface 122. Alternatively, the support plate 52 may be separately provided from, and attached to, the first arm portion 102 at the support plate interface 122.

The first arm portion 102 includes a plurality of openings 124 extending through the upright wall 112. The openings 124 are spaced apart from one another and are aligned with one another along a longitudinal axis 126 of the first arm portion 102. Optionally, the openings 124 may be positioned relatively closer to one of the upper or lower rails 118, 120. While two openings 124 are illustrated in FIG. 3, it is realized that the number of openings 124 may be greater than, or less than, two depending on the size of the first arm portion 102 and/or depending on the number of positions desired between the first and second arm portions 102, 104.

The second arm portion 104 includes an upright wall 132 having an inner surface 133 and an outer surface 134. The second arm portion 104 extends between a front end 135 and a rear end 136. An upper rail 138 extends generally inwardly from a top side of the upright wall 132. A lower rail 140 extends generally inwardly from a bottom side of the upright wall 132. The upright wall 132 and the rails 138, 140 together form a C-shaped channel 142 configured to receive the first arm portion 102. The first arm portion 102 is sized to nest within the channel 142 such that the outer surface 114 of the first arm portion 102 engages the inner surface 133 of the second arm portion 104. The upright walls 112, 132 engage one another, the upper rails 118, 138 engage one another, and the lower rails 120, 140 engage one another. The upper and lower rails 138, 140 of the second arm portion 104 capture the first arm portion 102 and resist rotational movement of the first arm portion 102 with respect to the second arm portion 102. The upper and lower rails 138, 140 of the second arm portion 104 allow only translational movement parallel to the longitudinal axis 126 of the first arm portion 102.

The second arm portion 104 includes a mounting portion 144 at the front end 135 thereof. The mounting portion 144 is integrally formed with the upright wall 132 and includes a downwardly extending tab 146. Alternatively, the mounting portion 144 may be separately provided from, and attached to, the second arm portion 102. The tab 146 defines a mount for the second arm portion 102 for mounting the second arm portion 104 to the patch panel 22. The tab 146 is bent at approximately 90 degrees such that the tab 146 has a substantially horizontal portion for resting on the mounting location on the lower ledge 60 (shown in FIG. 2) of the patch panel 22. The tab 146 includes on opening 148 therethrough for receiving the mounting post 62 (shown in FIG. 2) during assembly.

The second arm portion 104 includes a plurality of openings 150 extending through the upright wall 132. The openings 150 are spaced apart from one another and are aligned with one another along a longitudinal axis 152 of the second arm portion 104. Optionally, the openings 150 may be positioned relatively closer to one of the upper or lower rails 138, 140. While two openings 150 are illustrated in FIG. 3, it is realized that the number of openings 150 may be greater than, or less than, two depending on the size of the second arm portion 104 and/or depending on the number of positions desired between the first and second arm portions 102, 104. During assembly, at least one of the openings 124 of the first arm portion 102 are aligned with a corresponding one(s) of the openings 150 of the second arm portion 104 and the coupler 110 is used to securely couple the first and second arm portions 102, 104 to one another. By aligning different ones of the openings 124, 150, the relative positions of the first and second arm portions 102, 104 may be adjusted.

In an exemplary embodiment, the second arm portion 104 includes a secondary opening 154 extending through the upright wall 132. The secondary opening 154 receives a secondary coupler 156 used to join the locking finger 106 to the second arm portion 104. The secondary coupler 156 may be any type of coupler, such as a threaded fastener, a thumb screw, a pin, a bolt, a dowel, a rivet, a latch, a wire tie, and the like. In an exemplary embodiment, the secondary coupler 156 also couples the bias mechanism 108 to the second arm portion 104. However, in alternative embodiments, the bias mechanism may be coupled to the second arm portion 104 using a different coupler, or may not be coupled to the second arm portion 104 at all. In the illustrated embodiment, the secondary coupler 156 includes a shaft 158 extending through the secondary opening 154 and the locking finger 106 rotates about the shaft 158.

The locking finger 106 includes an upright wall 162 having an inner surface 163 and an outer surface 164. The locking finger 106 extends between a front end 165 and a rear end 166. The locking finger 106 includes a mounting portion 168 at the front end 165 thereof. The mounting portion 168 is integrally formed with the upright wall 162 and includes an upwardly extending tab 170. The tab 170 defines a mount for the locking finger 106 for mounting the locking finger 106 to the patch panel 22. The tab 170 is bent at approximately 90 degrees such that the tab 170 has a substantially horizontal portion for resting against the mounting location on the upper ledge 60 (shown in FIG. 2) of the patch panel 22. The tab 170 includes on opening 172 therethrough for receiving the mounting post 62 (shown in FIG. 2) during assembly. The operation of the locking finger 106 will be described in further detail below.

In an exemplary embodiment, the bias mechanism 108 is a metal spring having opposed ends 174, 176. The bias mechanism 108 is wound around a central bore 178 that receives the shaft 158 of the secondary coupler 156. As such, the secondary coupler 156 holds the bias mechanism 108 in place. In alternative embodiments, the bias mechanism 108 may be another type of flexible elastic object used to store mechanical energy, such as a compressible foam, a compressible plastic, an elastomer, and the like.

Figure 4:
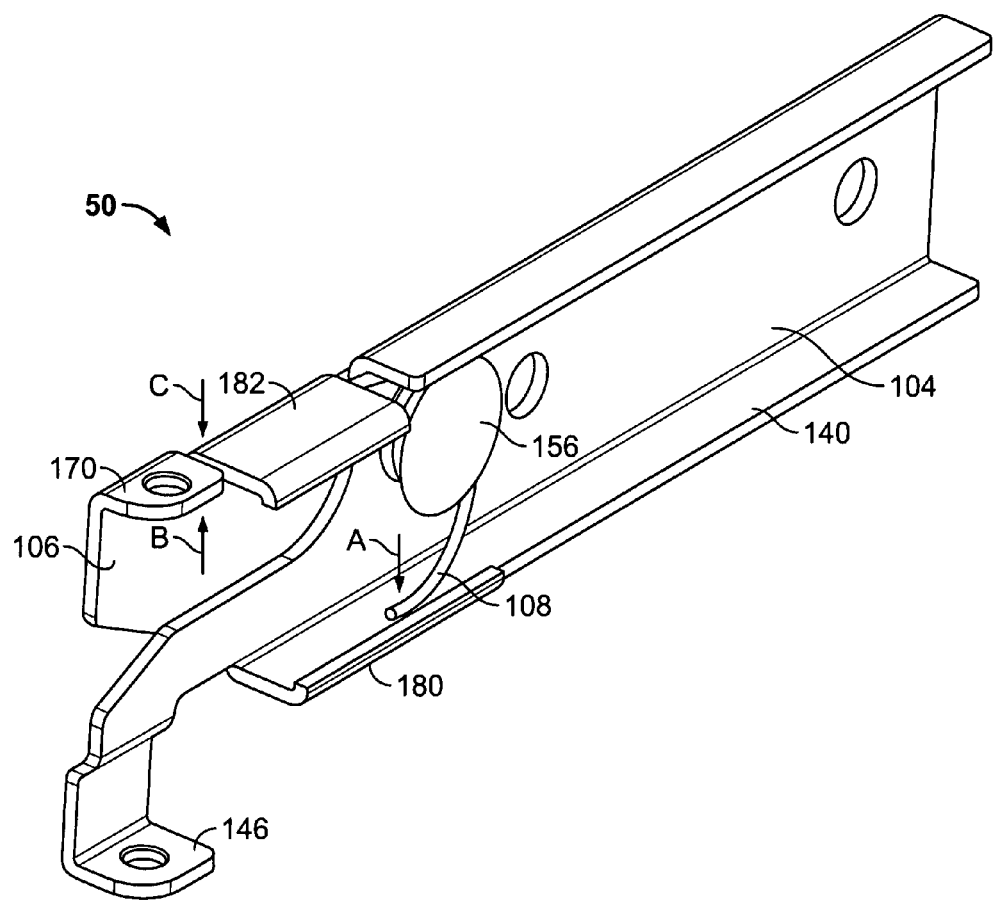
FIG. 4 is an assembled view of a portion of the support bracket shown in FIG. 3.

FIG. 4 is an assembled view of a portion of the support bracket 50 illustrating the locking finger 106 coupled to the second leg portion 104. The locking finger 106 is coupled to the second leg portion 104 using the secondary coupler 156. In the illustrated embodiment, the locking finger 106 is rotatably coupled to the second leg portion 104, wherein the locking finger 106 rotates about the secondary coupler 156. The locking finger 106 is positioned such that the tab 170 of the locking finger 106 is substantially aligned with the tab 146 of the second arm portion 104. However, if the mounting posts 62 are off-set and not aligned with one another, the tabs 170, 146 may be similarly off-set.

The second arm portion 104 includes an arm flange 180 extending from the lower rail 140 that is adapted to capture the bias mechanism 108. Similarly, the locking finger 106 includes a flange 182 that is adapted to capture the bias mechanism 108. Optionally, the flange 182 may be at least partially aligned with the arm flange 180.

Figure 5:
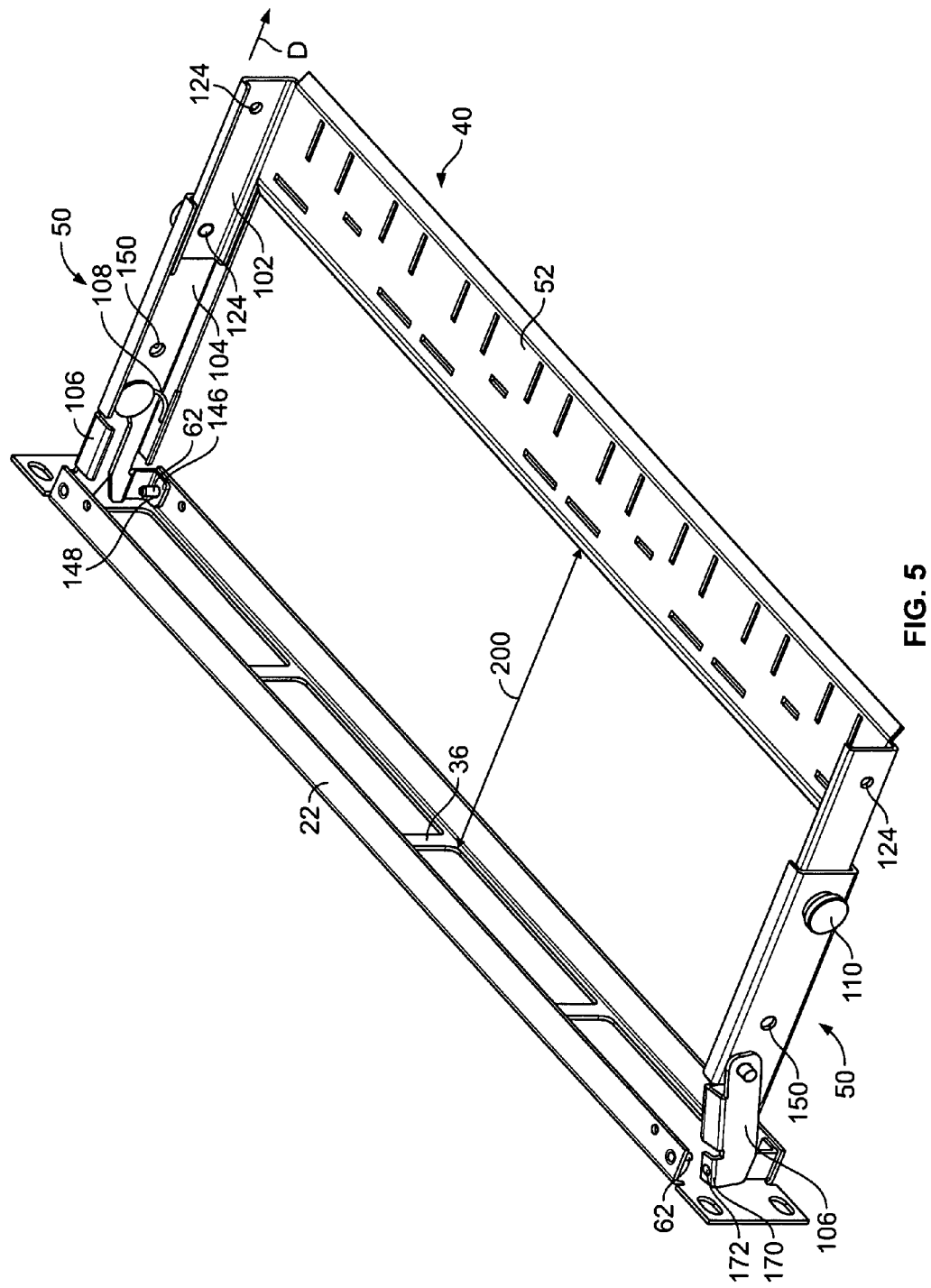
FIG. 5 is a rear perspective view of the cable manager shown in FIG. 2 in an extended state.

Once assembled, the lower rail 140 and/or arm flange 180 supports one end 174 of the bias mechanism 108 and the flange 182 supports the other end 176 (shown in FIG. 3) of the bias mechanism 108. The bias mechanism 108 presses against the lower rail 140 and/or arm flange 180 in the direction of arrow A, and the bias mechanism 108 presses against the flange 182 in the opposite direction, shown by arrow B. As such, the bias mechanism 108 forces the locking finger 106 to a biased position (as shown in FIG. 4). The locking finger 106 may be moved from the biased position to a released position, which is illustrated in FIG. 5, by pressing the locking finger 106 in a downward direction, such as in the direction of arrow C. In an exemplary embodiment, the locking finger 106 is rotated about the secondary coupler 156 between the released and the biased positions.

In alternative embodiments, the locking finger 106 may be moved in a linear direction rather than a pivoted direction. For example, the secondary opening 154 may be elongated such that the locking finger 106 may be able to move linearly. In another alternative embodiment, rather than forcing the locking finger upward to a biased position, the locking finger 106 may be pulled or otherwise forced downward by the bias mechanism 108 to the biased position, and the locking 106 may be moved to the released position by pulling up on the locking finger 106. In such an embodiment, both mounting posts 62 (shown in FIG. 2) may be upwardly extending. Other types of movements and configurations of locking fingers 106 may be provided in other alternative embodiments, wherein the locking fingers 106 are movable from a locked position to an unlocked position by an operator. It may also be beneficial that the locking finger 106 be movable by hand and without the need for a separate tool. As such, the cable support bracket 50 may be mounted to the patch panel 22 in a quick and efficient manner.

FIG. 5 is a rear perspective view of the cable manager 40 in an extended state, as opposed to FIG. 2, which illustrates the cable manager 40 in a retracted state. FIG. 5 also illustrates the cable manager 40 mounted to the patch panel 22. As described above, the cable manager 40 may include more than one cable support bracket 50 to support the cable support plate 52. The cable support brackets 50 are each mounted to the patch panel 22 in a similar manner.

During assembly, when mounting each cable support bracket 50 to the patch panel 22, the tab 146 is mounted to the lower mounting post 62 by lowering the tab 146 onto the mounting post 62 such that the mounting post 62 is received within the opening 148. Each locking finger 106 is moved to the released position, such as the position of the locking finger 106 illustrated in FIG. 5 on the left-hand side of the Figure. When the locking finger 106 is in the released position, the opening 172 of the tab 170 of the locking finger 106 may be aligned with the upper mounting post 62 of the patch panel 22. If the locking finger 106 were not in the released position during assembly, then the locking finger 106 may not be capable of being properly aligned with the mounting post 62. Once the locking finger 106 is properly positioned, the locking finger 106 is released, and the locking finger 106 is forced to the biased position by the bias mechanism 108. In the biased position, the locking finger 106 engages the mounting post 62 of the patch panel 22 and secures the cable support bracket 50 to the patch panel 22.

To remove the cable support bracket 50 from the patch panel 22, the locking finger 106 is moved to the released position. The locking finger 106 is disengaged from the mounting post 62 and the cable support bracket 50 may be removed from the patch panel 22. Optionally, the cable support bracket 50 may be rotated downwardly and then raised off of the lower mounting post 62, or alternatively, the cable support bracket 50 may be lifted vertically off of the lower mounting post and then moved rearward.

As described above, FIG. 5 illustrates the cable manager 40 in an extended state. In the extended state, the cable support plate 52 is positioned a distance 200 from the rear connectivity interface 36 of the patch panel 22. The distance 200 is greater in the extended state than the distance 66 of the retracted state, such as the state illustrated in FIG. 2. As described above, the first and second arm portions 102, 104 are movable with respect to one another. As such, the cable support plate 52 may be selectively positionable with respect to the patch panel 22. In the embodiment illustrated in FIG. 5, the first arm portion 102 is slid rearward, in the direction of arrow D until the forward most opening 124 in the first arm portion 102 is substantially aligned with the rearward most opening 150 in the second arm portion 104. The coupler 110 is then used to secure the relative position of the first arm portion 102 with respect to the second arm portion 104. Comparing the extended position to the retracted position of FIG. 2, in FIG. 2 the first arm portion 102 is slid forward, opposite to the direction of arrow D until the forward most opening 124 in the first arm portion 102 is substantially aligned with the forward most opening 150 in the second arm portion 104. The coupler 110 is then used to secure the relative position of the first arm portion 102 with respect to the second arm portion 104. Depending on the number of openings 124 and/or 150, various positions may be achieved.

By providing a cable manager 40 that has the ability to selectively position the cable support plate, the cable manager 40 is more versatile as compared to known cable supports that position a cable support bar in a single position. For example, rather than having an installer carry multiple different sized cable supports, the cable manager 40 allows the installer to vary the distance 200 of the cable support plate 52 from the patch panel 22. As such, the cable managers 40 stacked within the cable management system 10 (shown in FIG. 1) may better manage the cables 34 (shown in FIG. 1).

Figure 6:
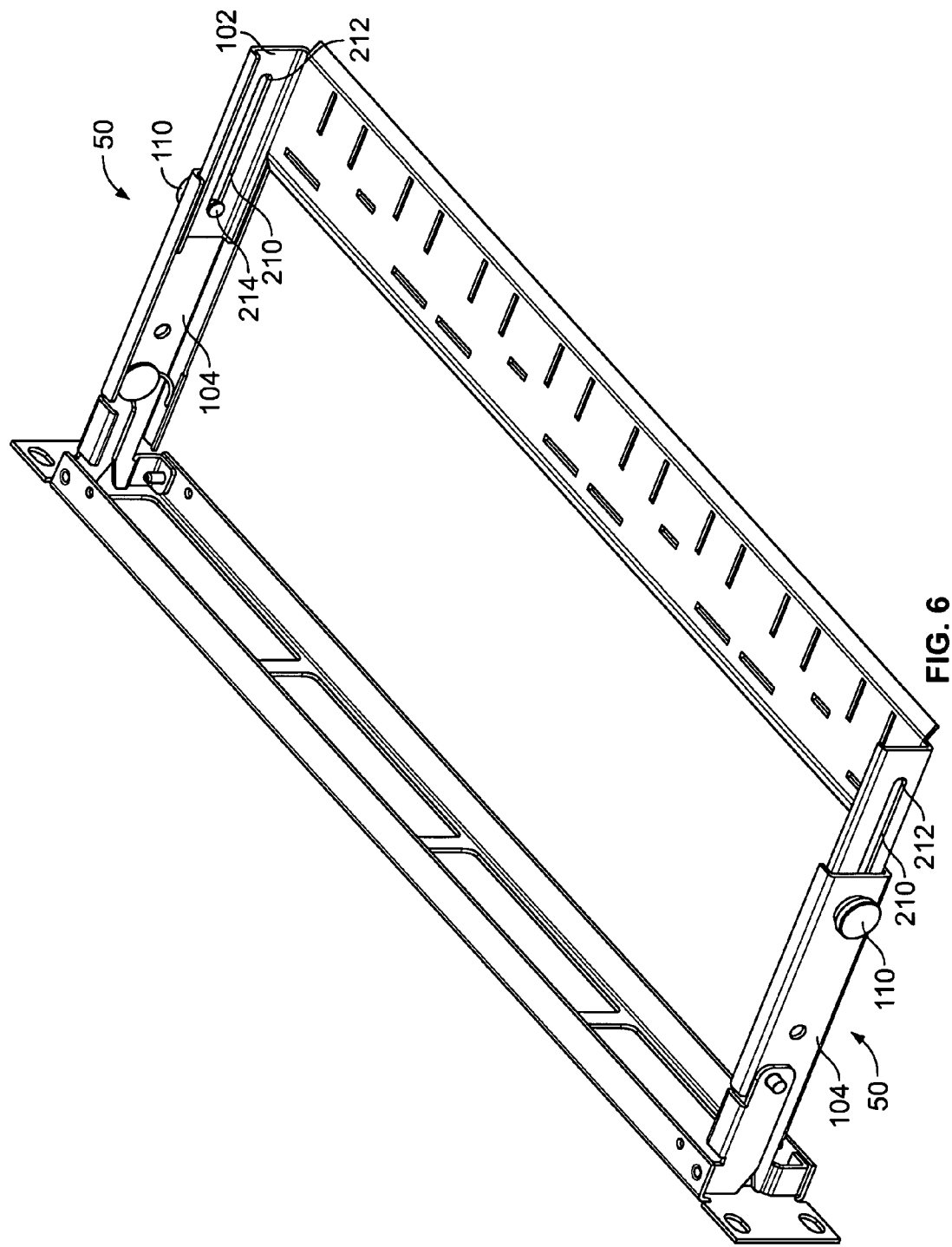
FIG. 6 is a rear perspective view of an alternative cable manager.

FIG. 6 is a rear perspective view of an alternative cable support bracket 50 for the cable management system 10 (shown in FIG. 1). The cable support bracket 50 illustrated in FIG. 6 differs from the cable support brackets described above in that the cable support bracket 50 includes a first arm portion 102 that includes an elongated slot 210 rather than a plurality of openings 124 (shown in FIG. 3). The elongated slot 210 allows the coupler 110 to secure the first arm portion 102 to the second arm portion 104 in any number of positions between a forward-most-position and a rearward-most-position. In the forward-most position, the coupler 110 engages a rearward end 212 of the slot 210. In the rearward-most position, the coupler 110 engages a forward end 214 of the slot 210.

Figure 7:
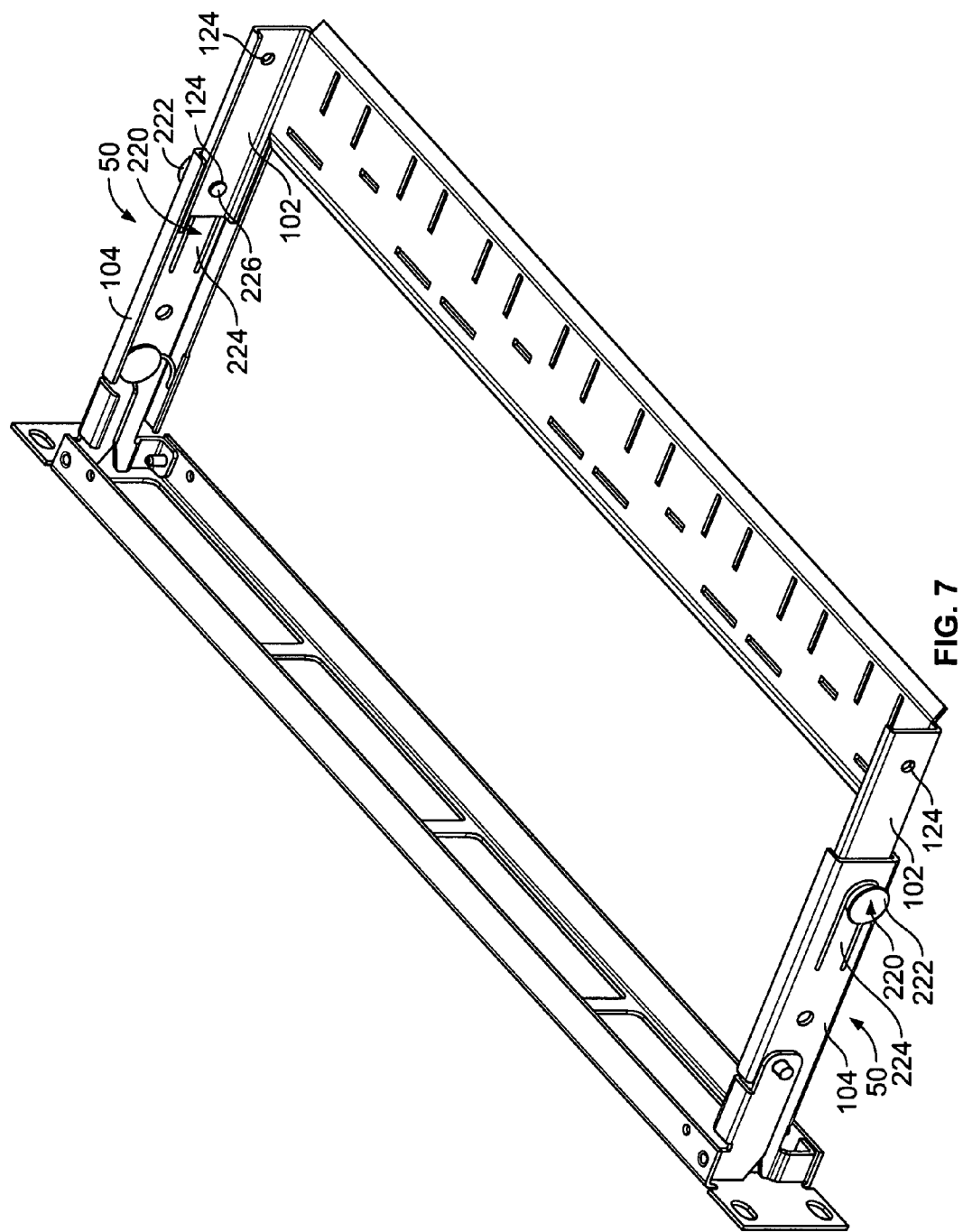
FIG. 7 is a rear perspective view of another alternative cable manager.

FIG. 7 is a rear perspective view of another alternative cable support bracket 50 for the cable management system 10 (shown in FIG. 1). The cable support bracket 50 illustrated in FIG. 7 differs from the cable support brackets described above in that the cable support bracket 50 includes a second arm portion 104 that includes a coupler represented by a latch 220 rather than a threaded fastener as illustrated in the above figures.

The latch 220 includes a handle 222 at an end of a deflectable beam 224. A pin extends inward from the handle 222 and/or the beam 224 to engage a respective one of the openings 124 in the first arm portion 102. The latch 220 thus secures the position of the first arm portion 102 with respect to the second arm portion 104. The number of positions depends on the number of openings 124 in the first arm portion 102. In an alternative embodiment, rather than individual openings, the first arm portion 102 may include an elongated slot with teeth arranged along the slot, wherein the latch engages the teeth to selectively position the first arm portion 102 with respect to the second arm portion 104.

Figure 8:
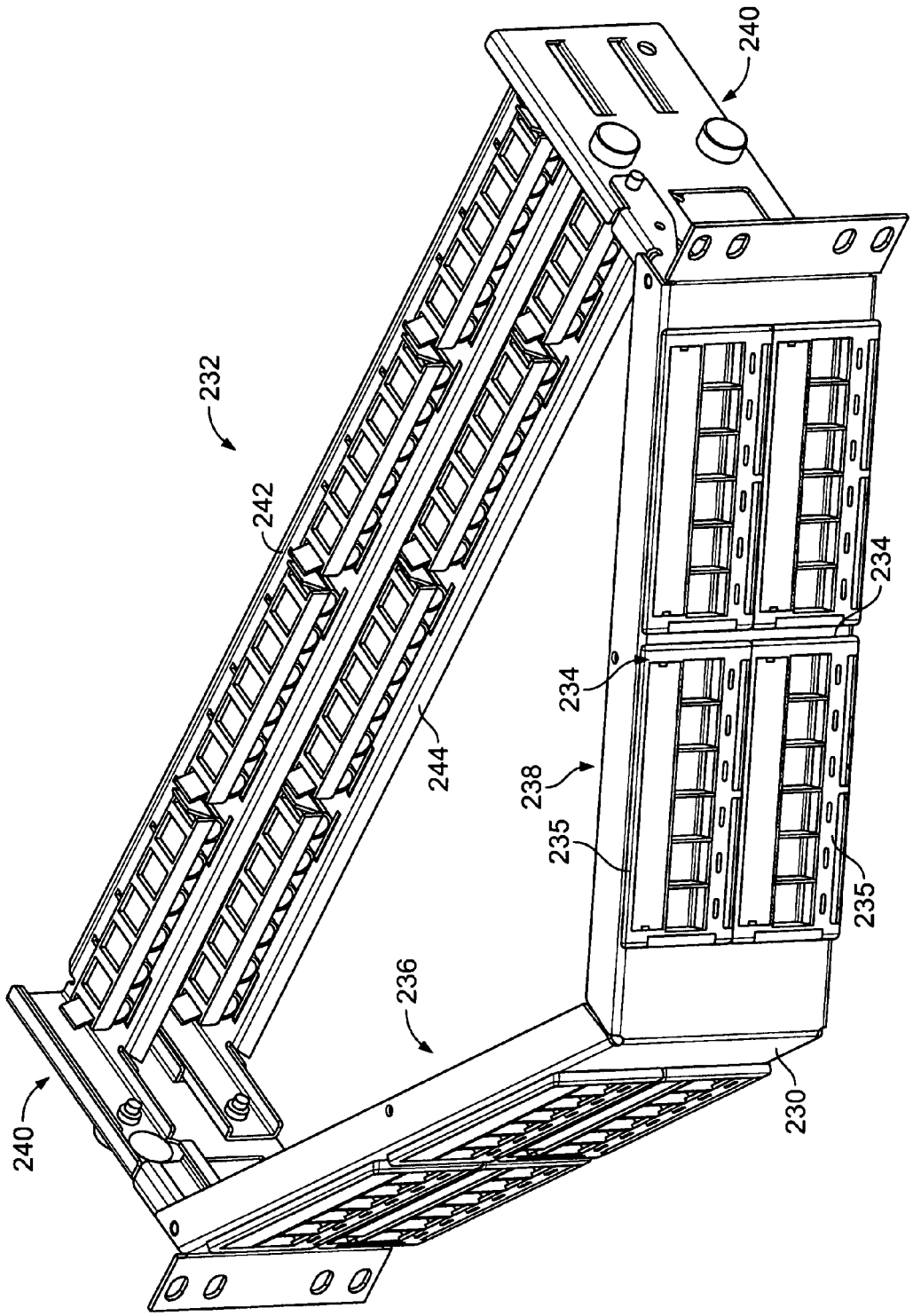
FIG. 8 is a front perspective view of an alternative patch panel and alternative cable manager.

FIG. 8 is a front perspective view of an alternative patch panel 230 and alternative cable manager 232 for the cable management system 10 (shown in FIG. 1). The patch panel 230 includes two rows of openings 234 that each receives electronic modules 235, which may be similar to the electronic modules 28 (shown in FIG. 1). The patch panel 230 is non-planar and includes two sections 236, 238 that are angled away from one another. The patch panel 230 is mounted to the rack frame 12 (shown in FIG. 1) in a similar manner as the patch panel 22 (shown in FIG. 1).

The cable manager 232 includes a pair of cable support brackets 240 that are attached to the patch panel 230, an upper cable support plate 242 and a lower cable support plate 244. Both support plates 242, 244 extend between the opposed cable support brackets 240. The cable support brackets 240 hold and position the cable support plates 242, 244 such that the cable support plates 242, 244 may support the cables 34 (shown in FIG. 1).

Figure 9:
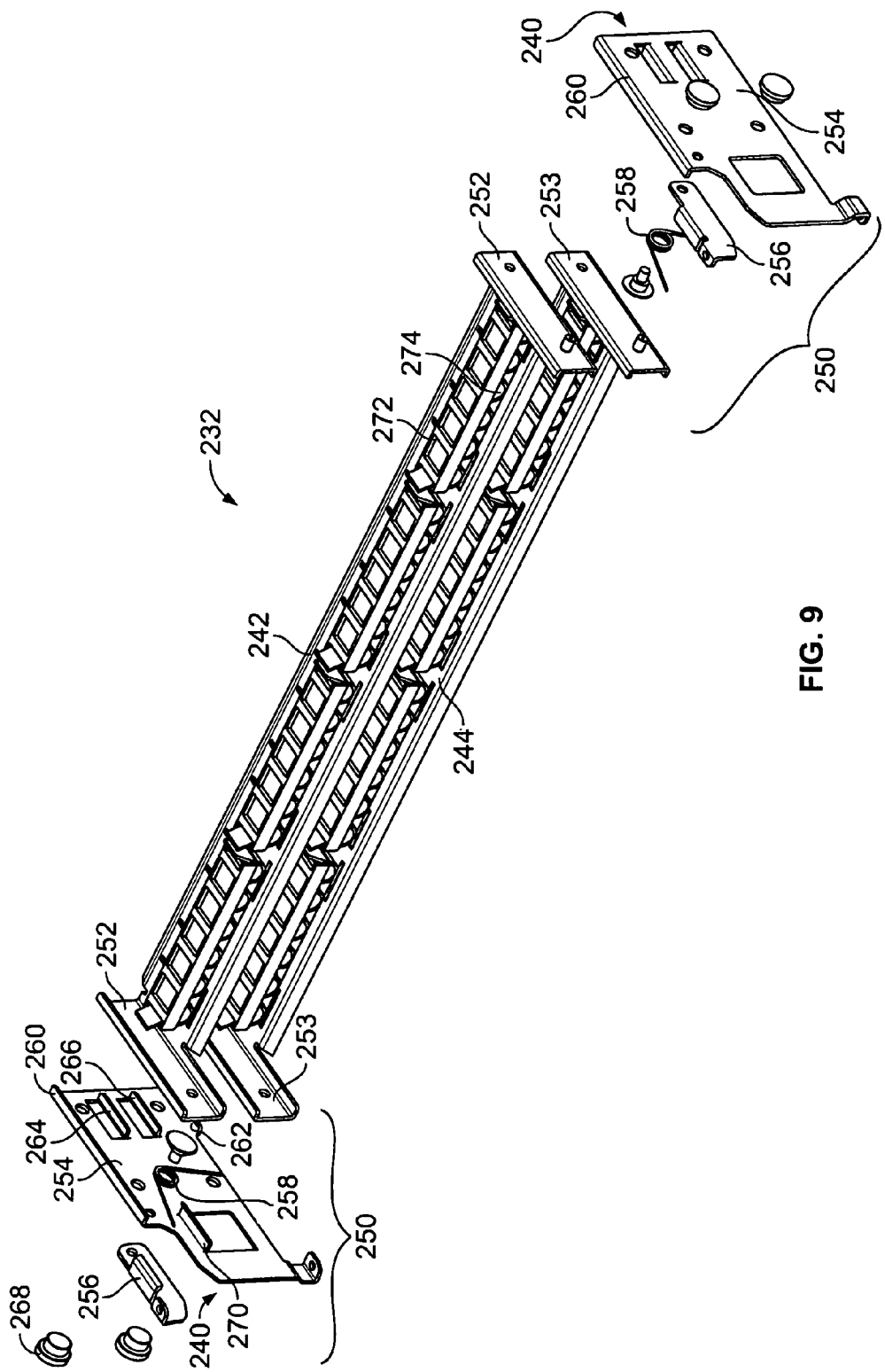
FIG. 9 is an exploded view of the cable manager shown in FIG. 8.

FIG. 9 is an exploded view of the cable manager 232. Each of the cable support brackets 240 includes an arm 250 having two inner arm portions 252, 253, an outer arm portion 254, a locking finger 256 movably coupled to the outer arm portion 254, and a bias mechanism 258. The inner arm portions 252, 253 are stacked with respect to one another and define upper and lower inner arm portions 252, 253, respectively. The bias mechanism 258 operatively engages the second arm portion 254 and the locking finger 256 to force the locking finger 256 to a biased position (shown in FIG. 8) from a released position (not shown). The cable support bracket 240 is configured to be coupled to the patch panel 230 (shown in FIG. 8) by the outer arm portion 254 and the locking finger 256 in a similar manner as the cable support bracket 50 (shown in FIGS. 1-7). The upper bracket support plate 242 extends from the upper inner arm portion 252, and the lower bracket support plate 244 extends from the lower inner arm portion 253.

The outer arm portion 254 includes an upper rail 260 and a lower rail 262. The outer arm portion 254 also includes an upper ledge 264 and a lower ledge 266. The upper inner arm portion 252 is slidably captured between the upper rail 260 and the upper ledge 264. The lower inner arm portion 253 is slidably captured between the lower rail 262 and the lower ledge 266. Couplers 268 are used to securely couple the inner arm portions 252, 253 to the outer arm portion 254 in a similar manner as described above.

The outer arm portion 254 includes a shoulder 270 extending inwardly. The shoulder 270 is positioned generally below the locking finger 256. The shoulder 270 supports the bias mechanism 258 and provides a biasing surface for the bias mechanism 258.

FIG. 9 also illustrates a plurality of clips 272 coupled to the cable support plates 242, 244. The clips 272 orient and hold the cables 34 (shown in FIG. 1). The clips 272 include channels 274 that receive the cables 34 therein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. A cable management system for an electrical component having a connectivity interface configured to connect with cables, said cable management system comprising a cable support bracket having a cable support plate configured to support the cables connected to the connectivity interface, and an arm having first and second arm portions, the first arm portion being coupled to the cable support plate and the second arm portion configured to be coupled to the electrical component, the first and second arm portions are selectively positionable with respect to one another in more than one position such that the position of the cable support plate may be changed with respect to the connectivity interface, wherein the first and second arm portions are configured to be coupled to one another in any number of positions between a forward-most position and a rearward-most position.

2. The cable management system of claim 1, wherein the first and second arm portions are slidably coupled to one another.

3. The cable management system of claim 1, wherein the first arm portion includes at least two openings spaced apart from one another along a longitudinal axis of the first arm portion, the cable support bracket further including a fastener configured to be received in one of the openings to secure the first and second arm portions to one another.

4. The cable management system of claim 1, wherein the first arm portion includes an elongated slot extending along a longitudinal axis of the first arm portion, the cable support bracket further including a fastener configured to be received in the slot, and selectively positionable along the slot, to secure the first and second arm portions to one another.

5. The cable management system of claim 1, wherein the first arm portion includes an inner and an outer surface, the cable support plate extending generally perpendicularly from the inner surface of the first arm portion, the outer surface engaging the second arm portion.

6. The cable management system of claim 1, wherein the first arm portion defines an inner rail and the second arm portion defines an outer rail, the inner and outer rails being slidably coupled to one another and configured to be secured in position with respect to one another.

7. The cable management system of claim 1, wherein the second arm portion includes opposed rails extending along a length of the second arm portion, the opposed rails being configured to capture the first arm portion therebetween to resist rotational movement of the first arm portion with respect to the second arm portion.

8. The cable management system of claim 1, wherein the first and second arm portions extend between the electrical component and the cable support plate, and wherein the cable support plate extends parallel to and is spaced apart from the connectivity interface of the electrical component.

9. The cable management system of claim 1, wherein the electrical component defines a patch panel, the cable support bracket being joined to the patch panel independent of a frame.

10. The cable management system of claim 1, further comprising a second cable support bracket having a second arm configured to be coupled to the electrical component and supporting the cable support plate.

11. The cable management system of claim 10, wherein the second arm includes third and fourth arm portions, the third arm portion being coupled to the cable support plate and the fourth arm portion configured to be coupled to the electrical component, the third and fourth arm portions are selectively positionable with respect to one another such that the position of the cable support plate may be changed with respect to the electrical component.

12. The cable management system of claim 1, wherein the electrical component includes a first row of openings configured to receive electronic modules therein that are configured to connect with the cables, and wherein the electrical component includes a second row of openings configured to receive electronic modules therein that are configured to connect with the cables, the cable support bracket configured to support cables from electronic modules in both rows.

13. The cable management system of claim 12, wherein the cable support bracket further includes a second cable support plate extending from the first arm portion, the second cable support plate being configured to support the cables connected to the electronic modules within the second row of openings.

14. The cable management system of claim 1, further comprising a rack frame and a plurality of patch panels coupled to the rack frame, the rack frame having opposed first and second legs, the patch panels extending between and being coupled to the first and second legs, the cable support bracket being removably mounted to at least one of the rack frame and a corresponding one of the patch panels.

15. A cable support bracket comprising:
a first rail having a wall extending between opposed ends and a support plate interface proximate one of the ends, wherein a cable support plate is positioned at the support plate interface; and
a second rail having a wall extending between opposed ends and a mounting portion proximate one of the ends that is configured to be mounted to an electrical component, and to be secured thereto;
wherein the first rail and the second rail are coupled to one another and are selectively positionable with respect to one another such that the position of the cable support plate may be changed with respect to the electrical component.

16. The cable support bracket of claim 15, wherein each of the walls are generally planar and are parallel to one another.

17. The cable support bracket of claim 15, wherein the first and second rails are slidably coupled to one another and configured to be secured in position with respect to one another.

18. The cable support bracket of claim 15, wherein the wall of the first rail includes at least two openings spaced apart from one another along a longitudinal axis of the first rail, the cable support bracket further including a fastener configured to be received in one of the openings to secure the first and second rails to one another.

19. The cable support bracket of claim 15, wherein the first rail includes an elongated slot extending along a longitudinal axis of the first arm portion, the cable support bracket further including a fastener configured to be received in the slot, and selectively positionable along the slot, to secure the first and second rails to one another.

20. The cable support bracket of claim 15, wherein the second rail includes opposed rails extending along opposed sides of the wall of the second rail, the opposed rails being configured to capture the first rail therebetween to resist rotational movement of the first rail with respect to the second rail.

21. The cable support bracket of claim 15, wherein the cable support plate is integrally formed with the first rail.

\* \* \* \* \*